(12) United States Patent
Belgardt et al.

(10) Patent No.: US 7,171,395 B1
(45) Date of Patent: Jan. 30, 2007

(54) METHOD FOR OPERATING A SECONDARY COMPUTER, SWITCHING DEVICES FOR FLAWLESS OPERATION AND CORRESPONDING PROGRAMME

(75) Inventors: Eckhardt Belgardt, In-Bangalore (IN); Martin Mueller, Neu-Ulm (DE); Gerhard Pooch, Emmering (DE); Klaus Steinigke, Munich (DE); Rudolf Stelzl, Dachau (DE)

(73) Assignee: Siemens Aktiengesellschaft, Munich (DE)

( * ) Notice: Subject to any disclaimer, the term of this patent is extended or adjusted under 35 U.S.C. 154(b) by 362 days.

(21) Appl. No.: 10/111,718

(22) PCT Filed: Oct. 27, 2000

(86) PCT No.: PCT/DE00/03812

§ 371 (c)(1),
(2), (4) Date: Aug. 21, 2002

(87) PCT Pub. No.: WO01/31934

PCT Pub. Date: May 3, 2001

(30) Foreign Application Priority Data

Oct. 29, 1999 (DE) .................................. 199 52 312

(51) Int. Cl.
 *G06F 17/30* (2006.01)
 *G06F 7/00* (2006.01)
(52) U.S. Cl. .......................................... 707/1; 707/202
(58) Field of Classification Search ............ 707/103 R, 707/200, 202, 203–205, 206, 1, 10; 714/6, 714/15, 16, 20, 5; 711/3, 4, 112, 119; 710/28, 710/106, 113; 709/223, 206
See application file for complete search history.

(56) References Cited

U.S. PATENT DOCUMENTS

| | | | | |
|---|---|---|---|---|
| 5,276,867 A | * | 1/1994 | Kenley et al. | 707/204 |
| 5,295,134 A | | 3/1994 | Yoshimura et al. | |
| 5,307,477 A | * | 4/1994 | Taylor et al. | 711/3 |
| 5,469,503 A | * | 11/1995 | Butensky et al. | 379/265.02 |
| 5,537,533 A | * | 7/1996 | Staheli et al. | 714/5 |
| 5,546,534 A | * | 8/1996 | Malcolm | 714/6 |
| 5,764,903 A | * | 6/1998 | Yu | 709/208 |
| 5,901,327 A | * | 5/1999 | Ofek | 710/5 |
| 5,915,095 A | * | 6/1999 | Miskowiec | 709/223 |
| 6,205,449 B1 | * | 3/2001 | Rastogi et al. | 707/202 |
| 6,324,654 B1 | * | 11/2001 | Wahl et al. | 714/6 |
| 6,338,126 B1 | * | 1/2002 | Ohran et al. | 711/162 |
| 6,587,970 B1 | * | 7/2003 | Wang et al. | 714/47 |
| 6,792,557 B1 | * | 9/2004 | Takamoto et al. | 714/7 |

OTHER PUBLICATIONS

XP-000700290: The MainStreetXpress 36190: a scalabe and highly reliable ATM core services switch Mar. 25, 1999.

* cited by examiner

*Primary Examiner*—Jeffrey Gaffin
*Assistant Examiner*—Jacques Veillard
(74) *Attorney, Agent, or Firm*—Morrison & Foerster LLP

(57) ABSTRACT

The invention relates among other things to a method for operating a secondary computer (22), in which a memory unit in an originating computer (12) initially stores a first data volume (112) and a second data volume (114). During transmission of copies of the data volumes (112, 114), change reports (150, 154) are processed in the originating computer (12) and in a secondary computer (22) irrespective of whether the associated data volume has already been transmitted.

18 Claims, 5 Drawing Sheets

METHOD FOR OPERATING A SECONDARY COMPUTER, SWITCHING DEVICES FOR FLAWLESS OPERATION AND CORRESPONDING PROGRAMME

The invention relates to a method for operating a secondary computer, in which a first memory unit in a primary computer stores data. A memory unit in a secondary computer stores a duplicate of the data. On the basis of events during the operation of a control computer, the control computer produces change reports. The control computer transmits an event's associated change report to the primary computer immediately after the event. This ensures that the primary computer can process the change report in good time and can change a data item or data record affected by the change report.

The secondary computer is used, by way of example, as a redundant computer for the primary computer. In the event of an operating fault in the primary computer, the secondary computer adopts the function of the primary computer. Functional sequences which are necessary for the operation of an electronic unit can thus be maintained without interruption using the secondary computer in the event of an operating fault in the primary computer. However, when changing over between the primary computer and the secondary computer, it is necessary to choose a method in which there is as little data loss as possible.

Synchronous computer arrangements are known in which primary computers and secondary computers operate synchronously with respect to one another and use separate memory units or the same memory unit. This solution is complex in terms of circuitry, however. In addition, the data in the jointly used memory unit need to be stored using a special method in order to prevent data loss in the event of failure of the memory unit.

Another solution involves the secondary computer generating new user-related data after the primary computer has failed. The previous data are lost and therefore cannot be used further. In this case, the time computer's readiness is also referred to as "cool-standby".

If the duplicate of the data is transmitted to the secondary computer from a superordinate computer only after the operating fault in the primary computer, this results in a relatively long interruption to the application. Such interruptions should actually be avoided during flawless operation, however.

It is an object of the invention to specify a simple method for operating a secondary computer which ensures that, in the event of faults in another computer, the secondary computer can adopt the function of this computer without substantial data loss. In addition, associated switching devices and an associated program need to be specified.

The object relating to the method is achieved by a method having the method steps specified in patent claim 1. Developments are specified in the subclaims.

In the case of the inventive method, in addition to the method steps cited in the introduction, a duplicate of the change report is also transmitted to the secondary computer immediately. The data and their duplicate are changed in the primary computer and in the secondary computer on the basis of the change reports. The change reports are transmitted both to the primary computer and to the secondary computer immediately after the event which resulted in the change reports. Immediate transmission requires, in particular, that no prescribable time be waited until a plurality of change reports can be transmitted to the secondary computer. With immediate transmission, it is also not possible first to wait until a prescribed number of change reports need to be transmitted to the secondary computer. Hence, in the case of the inventive method, the change reports are transmitted to the secondary computer simultaneously, or not much after the change reports to the primary computer.

Data loss is also prevented when the primary computer contains not only data which remain unchanged over a number of years but also data which change in the course of a few seconds. If failure must be expected at any time, immediate forwarding is a simple way of preventing interruptions for updating in the event of a fault. In particular, the use of the inventive method does not first require a large amount of data to be updated for brief connections, as would be the case with cyclic updating on the basis of a plurality of change reports.

The immediate transmission of the change report ensures that virtually no data loss arises in the event of failure of the primary computer and immediate changeover to the secondary computer. The secondary computer constantly contains the most recent dataset. The immediate transmission of the change reports means that, at the outside, a single change report in the secondary computer is not processed if the primary computer fails. The changeover time is approximately 50 milliseconds, for example.

In one development of the inventive method, the change reports are transmitted directly from the control computer to the secondary computer without the involvement of the primary computer. In this case, an additional cross channel for transmitting the change reports from the primary computer to the secondary computer is not required. If a cross channel between the primary computer and the secondary computer is available for other purposes, the change reports use none of the cross channel's transmission capacity.

In one alternative requirement, the change reports are transmitted from the primary computer to the secondary computer. To ensure normal operation of the application, the change reports need to be transmitted to the primary computer anyway. The control computer need send the change reports only to the primary computer without needing to process additional change reports to the secondary computer. This refinement thus results in relief of the load on the control computer.

The object cited above is also solved by a method having the method steps specified in patent claim 4. Developments are specified in the subclaims referring back to this claim.

The inventive method in accordance with patent claim 4 is also referred to below as the method based on a second aspect of the invention. At the start of this method, a memory unit in an originating computer stores a first data volume and a second data volume. The first data volume or a duplicate of the first data volume is transmitted from the originating computer to a secondary computer and is stored in a memory unit in the secondary computer. When the first data volume has been transmitted to the secondary computer, a change report is transmitted which concerns changes relating to the first data volume. In one embodiment, the change report is processed immediately after receipt in the secondary computer. This means that the associated change is made in the secondary computer before the second data volume is transmitted. Next, the second data volume itself or a duplicate of the second data volume is transmitted from the originating computer to the secondary computer and is stored in the memory unit in the secondary computer. From the point of view of the secondary computer, the second data volume is transmitted directly after the change report has been processed in the secondary computer, i.e. without performing other method steps in the interim which concern change reports or copying operations.

The insight underlying the method based on a second aspect of the invention is that only change reports concerning the already transmitted duplicate of the first data volume need to be transmitted. Changes concerning data which have not yet been duplicated can be made in the originating computer, which means that no change reports need to be transmitted to the secondary computer. Use of the inventive method based on a second aspect of the invention has revealed, surprisingly, that, in comparison with a method in which first the duplicates of the data volumes and then the change report are transmitted, change reports are now transmitted only for approximately half the changes. Th other half of the changes need be made only in the originating computer. This can be attributed to the fact that, at the start of the transmission operation for the data volumes, most of the changes concern data for which no duplicate has yet been transmitted, i.e. the second data volume. Only toward the end of the method do the changes increasingly concern data for which duplicates have already been transmitted, i.e. data in the first data volume.

A memory for storing the changes arising during transmission of the data volumes is not required in the inventive method based on a second aspect. Use of the inventive method based on a second aspect provides the assurance that a standby time at which the secondary computer holds the same data as the originating computer can be determined precisely. This is because the standby time is reached either when the duplicate of the second data volume is stored in the secondary computer or when the last change report is transmitted, depending on which operation is performed later. Since, as explained above, change reports need to be transmitted to the secondary computer only for approximately half of the changes which occur during copying, the standby time is reached early. If the data volumes' duplicates to be transmitted and the change reports are transmitted to the secondary computer on different paths, then the secondary computer is ready to adopt the function of a failed computer even earlier.

By way of example, the data volumes contain single values, such as integer values. However, data volumes which contain data records having the same structure are also used. A data volume can thus be considered both as a single data item or a single data record and as a particular number of data or data records.

In a first alternative of the inventive method, the originating computer is a primary computer whose function is adopted by the secondary computer in the event of operating faults in the primary computer. Change reports concerning the first data volume and change reports concerning the second data volume are transmitted to the originating computer from a control computer. The control computer is used to control the originating computer. The originating computer checks whether the change reports coming from the control computer concern the first data volume or the second data volume. Only change reports which concern an already duplicated data volume, i.e. the first data volume, are transmitted to the secondary computer. The change reports transmitted to the secondary computer are copies of the change reports transmitted to the originating computer, i.e. they contain essentially the same data. Alternatively, the change reports coming from the control computer are also forwarded to the secondary computer unchanged.

If change reports coming from the control computer concern a data volume which has not yet been duplicated, i.e. the second data volume, then a change prompted by the change report is made in the originating computer. The change report or a copy of the change report is not forwarded to the secondary computer in this case.

In the first alternative, the control computer needs to send the change reports only to the originating computer. In addition, the data volumes' duplicates to be transmitted and the change reports take the same transmission path.

If the change reports are produced, in the first alternative, by a control computer which has also sent the data volumes to be copied to the primary computer before the start of the method, then no additional load is placed on the control computer by the transmission of the duplicated data volumes from the primary computer to the secondary computer and by the transmission of the change reports.

In a second alternative, the originating computer is likewise a primary computer whose function is adopted by the secondary computer in the event of operating faults in the primary computer. Change reports concerning the first data volume and the second data volume are transmitted from a control computer for controlling the secondary computer to the secondary computer without the involvement of the originating computer, however. Hence, the data to be transmitted take a different path than the change reports.

This means that the data to be transmitted and the change reports can be transmitted to the secondary computer more quickly.

If the change reports reach the primary computer and the secondary computer approximately simultaneously, for example, the secondary computer need carry out only a few method steps in order to prevent the duplicate of a data volume from being changed in the second computer on account of a change report even though the data volume itself has already been changed in the originating computer before copying on account of a change report originating from the same event. In addition, both the data volume and the associated duplicate are certain to be up to date in every case. This is because if the secondary computer receives a change report concerning a data volume which has not been transmitted, this change report is not processed further. This is permissible because it can be assumed that a change report corresponding to the change report received in the secondary computer has already been processed in the primary computer before the data volume which has already been changed, or its duplicate, is sent to the secondary computer at a later time. If, by contrast, the secondary computer receives a change report concerning a data volumes' duplicate which has already been transmitted from the primary computer to the secondary computer, the change report is processed in the secondary computer and the relevant duplicate of the data volume is changed. It can be assumed that the duplicate has been transmitted before the change report's required change to the already duplicated data record has been made in the originating computer. Irrespective of the processing in the secondary computer, the primary computer thus also receives from the control computer a corresponding change report whose processing involves changing the already duplicated data volumes. The control computer is not encumbered by an additional checking method in the second alternative.

In a third alternative, the originating computer is a control computer for controlling the secondary computer. The originating computer checks whether the change reports to be transmitted concern the first data volume or the second data volume. The change reports are transmitted to the secondary computer only if they concern a data volume which has already been transmitted. All the change reports need to be sent to the primary computer in order to ensure correct operation of the application. In the control computer, the changes are likewise made if the data volumes are also required for other purposes. In the third alternative, data volumes and change reports which are to be transmitted take the same transmission path. An additional cross channel between the primary computer and the secondary computer is not required. If the originating computer or the control computer establishes that a change report concerns a data volume which has not yet been transmitted, the change is made in the control computer. A change report is sent to the primary computer but not to the secondary computer. The third alternative ensures that no superfluous change reports need to be transmitted. In addition, buffer storage of the change reports is not required when starting up the secondary computer.

In a fourth alternative of the inventive method based on a second aspect, the originating computer is a control computer for controlling the secondary computer. The change reports concerning the first data volume and the change reports concerning the second data volume are transmitted from the control computer to a primary computer whose function is adopted by the secondary computer in the event of operating faults in the primary computer. In the control computer, change report to be forwarded from the primary computer to the secondary computer are marked accordingly. On the basis of the marking, the primary computer forwards the marked changes themselves or a copy of these change reports. The data volumes' duplicates to be transmitted take a different transmission path than the change reports, which means that fast transmission can take place. The control computer is not encumbered more than necessary by the sending of the change reports, since the change reports need to be transmitted to the primary computer anyway. The primary computer and the secondary computer need to have a cross channel between them. This cross channel normally has a lower transmission capacity than the transmission channels from the control computer to the primary computer and from the control computer to the secondary computer. For transmitting the change reports, the transmission capacity of the cross channel is sufficient, however.

In one embodiment of the inventive method, the first data volume is transmitted in blocks with other data volumes. The second data volume is also transmitted in blocks with other data volumes. The block-by-block transmission of, by way of example, ten data volumes in each case achieves a reduction in the signaling complexity.

The inventive method based on a second aspect and its developments are employed before the method based on a first aspect is carried out. The methods based on the two aspects have a close technological relationship. Combining the methods ensures a "smooth" transition between the two methods. Additional method steps and additional measures do not need to be taken.

In one development of the inventive method based on a first aspect or on a second aspect, the computers involved operate asynchronously with respect to one another. Synchronization measures can thus be dispensed with. In addition, different memory units are used. This means that the computers do not access a common memory. The result of this is that it is a simple matter to change over to the other memory unit in the event of operating faults in one memory unit.

The inventive methods and their developments are used in switching centers which place very high demands on flawless operation.

The invention also relates to a switching device for carrying out the methods based on a first aspect and on a second aspect and developments thereof. The invention also relates to a program for carrying out the inventive methods and developments thereof. Hence, the technical effects mentioned above also apply to the switching devices and to the program.

Exemplary embodiments of the invention are explained below with reference to the appended drawings, in which.

Figure 1:
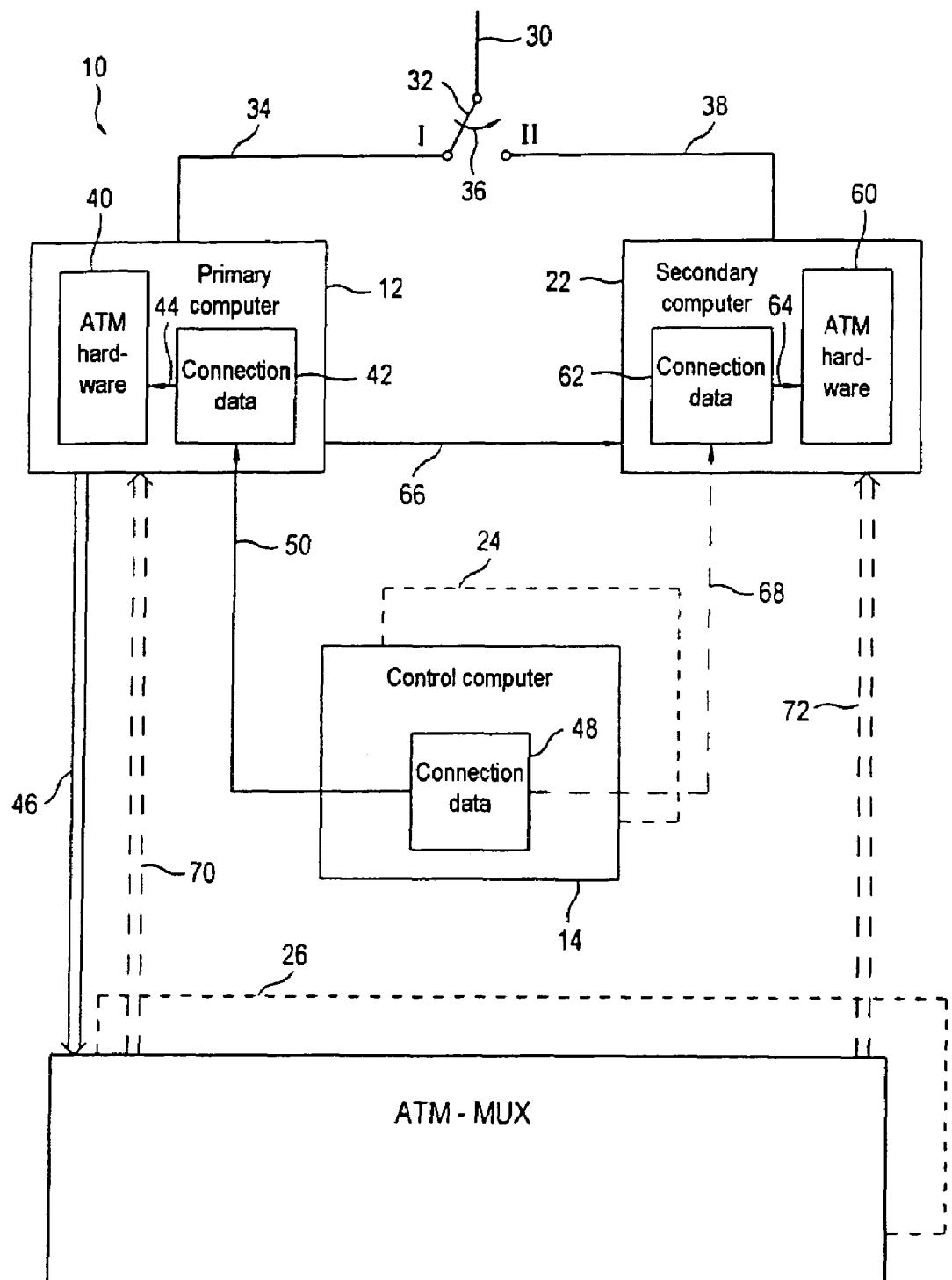
FIG. 1 shows the design of an ATM switching center.

FIG. 1 shows the design of an ATM switching center 10 (asynchronous transfer mode). The switching center 10 contains a subscriber line module 12, a control computer 14 and a switching matrix, from which a multiplexer 16 is shown in FIG. 1. So that operation of the switching center 10 is ensured even in the event of individual modules failing, the subscriber line module 12, the control computer 14 and the multiplexer 16 are present in duplicate, cf. subscriber line module 22, control computer 24 and multiplexer 26. A connecting line 30 is routed from a switching center (not shown) to the switching center 10. The connecting line 30 is used to transmit ATM cells to the switching center 10.

The connecting line 30 ends at a changeover device 32. During fault-free operation of the subscriber line module 12, the changeover device 32 is in a switch position I. In the switch position I, the connecting line 30 is connected to the subscriber line module 12 via a further connecting line 34. In the event of a fault in the subscriber line module 12, the changeover device 32 switches to a switch position II, cf. arrow 36. In the switch position II, the connecting line 30 is connected to a connecting line 38 which is routed to the subscriber line module 22. The subscriber line module 12 contains a circuit 40 for processing the ATM cells received. The circuit 40 removes "empty cells", for example. In addition, the cells are prepared for switching in the switching matrix using connection data 42, cf. arrow 44. The connection data 42 are stored in a memory in the subscriber line module 12 and contain details about "virtual connections" involving the cells to be switched being associated with one another using a channel number. In addition, there are connection data which concern "permanent connections", i.e. connections which are switched in a once-defined direction over a long period of time, for example a number of years. Following processing by the circuit 40, the cells are transmitted via a transmission link 46 to the multiplexer 16, where switching is started.

The subscriber line module 12 contains a microprocessor (not shown) which processes commands in a memory and in so doing uses the connection data 42 to control the circuit 40. The subscriber line module 12 is thus a primary computer.

The connection data 42 are a copy of connection data 48 stored in the control computer 14. The connection data 48 have been generated by the control computer 14 on the basis of signaling between the switching centers involved during connection setup and during connection cleardown. Copies of the connection data 48 have been transmitted as change reports via a transmission channel 50 to the subscriber line module 12 and stored as connection data 42.

The subscriber line module 22 is of the same design as the subscriber line module 12. A circuit 60 corresponds to the circuit 40. Connection data 62 match the connection data 42. An arrow 64 shows the influence of the connection data 62 on the circuit 60. If the subscriber line module 22 is on standby, no ATM cells are transmitted via the connection line 38. Nevertheless, the connection data 62 are constantly updated. The circuit 60 is controlled on the basis of the updates. This ensures that, in the event of operating faults in the subscriber line module 12, the subscriber line module 22 can adopt the function of this subscriber line module within a few milliseconds. The subscriber line module 22 is therefore also referred to as a secondary computer.

The connection data 62 are updated via the transmission channel 50 and a cross channel 66 which is routed from the subscriber line module 12 to the subscriber line module 22. All the change reports sent from the control computer 14 to the subscriber line module 12 are forwarded in the subscriber line module 12 to the subscriber line module 22 via the cross channel 66. In both subscriber line modules 12 and 22, the connection data 62 are changed on the basis of the change reports received.

However, a method is also used in which the change reports are sent to the subscriber line module 22 without using a cross channel 66. In this case, the change reports continue to be transmitted from the control computer 14 to the subscriber line module 12 via the transmission channel 50. In addition, the control computer uses a transmission channel 68 to transmit the change reports to the subscriber line module 22 directly, i.e. without the involvement of the subscriber line module 12. The change reports are sent to the subscriber line module 12 and to the subscriber line module 22 simultaneously by the control computer 14. The change reports are sent immediately after an event has occurred which has caused the change reports. Change report are thus not buffer stored in the control computer 14.

The subscriber line modules 12 and 22 also adopt functions for connecting lines (not shown) used to transmit cells from the switching center 10. Such connecting lines also have a changeover device corresponding to the changeover device 32. In FIG. 1, transmission links 70 and 72 indicate the transmission of cells which have been switched in a switching matrix and are sent to the subscriber line modules 12 and 22 by the multiplexer 16. When there are no faults in operation, the cells transmitted via the transmission links 70 and 72 are processed in both subscriber line modules 12 and 22 using the circuits 40 and 60. However, only the cells processed in the subscriber line module 12 are sent to the subsequent switching center. The cells processed in the circuit 60 are sent to a transmission link routed to the next switching center only when the changeover device corresponding to the changeover device 32 has changed over.

With reference to FIGS. 2 to 5, the text below explains two exemplary embodiments of methods which can be used to put the subscriber line module 22 on standby. Whereas the method explained with reference to FIG. 1 is carried out when the subscriber line module 22 is already ready, the methods explained with reference to FIGS. 2 to 5 are carried out, by way of example, when the switching center 10 is started up or when the subscriber line module 22 is started up, e.g. when the subscriber line module 22 is inserted into the switching center 10 again following repair and is started up again.

Figure 2:
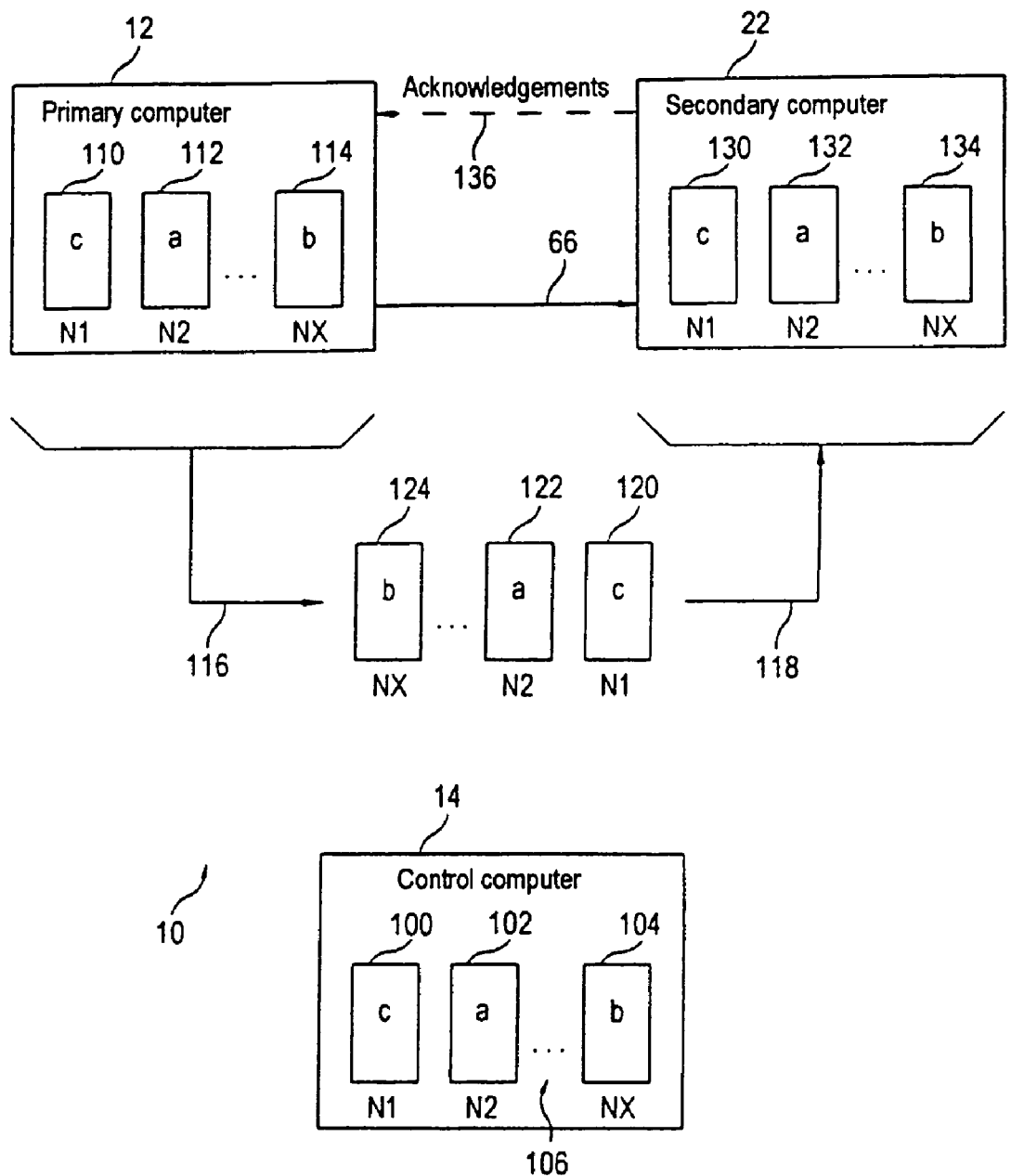
FIG. 2 shows the consistent copying of data records in the switching center.

FIG. 2 shows the consistent copying of data records in the switching center 10 in accordance with a first exemplary embodiment. Before the subscriber line module 22 is inserted into the switching center 10, the control computer 14 controls the subscriber line module 12. During the operation of the switching center 10, the control computer 14 has produced and stored data records 100 to 104 which each store the data for a virtual connection. Dots 106 indicate further data records which are stored in a memory unit in the control computer 14. The order in which the data records 100 to 104 are produced is indicated by lower case letters a, b and c. Hence, the connection data record 102 was produced first, then the connection data record 104 and finally the connection data record 100.

The different and random connection period means that the order in which the connections are produced is independent of a static number N1 to NX for numbering the memory locations in a cohesive memory area for storing the data records 100 to 104. X is a natural number greater than 1. If all the memory locations are used, a new connection data record can be stored only when a memory location becomes free. As soon as a new data record is produced in the control computer 14, the subscriber line module 12 is immediately sent a change report which contains the data of the newly produced data record. In the subscriber line module 12, the data transmitted are stored as data records 110 to 114. The data records 110 to 114 are thus copies of the data records 100 to 104. The order in time in which the data records 110 to 114 are produced matched the order in which the data records 100 to 104 were produced, cf. a, b and c. For the data records 110 to 114, static numbering N1 to NX is likewise stipulated which matches the numbering of the memory locations for the data records 100 to 104.

When a "virtual connection" between two subscribers is cleared down, the memory location used by the associated data record, e.g. 104, is released in the control computer 14. The data record stored in the released memory location is invalid or has been erased. At the same time, the subscriber line module 12 has a change report transmitted to it stipulating that the memory location used by the connection's associated data record, e.g. 114, likewise needs to be released in the subscriber line module 12.

When the subscriber line module 22 has been inserted into the switching center 10, copies of the data records 110 to 114 stored in the subscriber line module 12 at the time of insertion are copied in succession via the cross channel 66 to the subscriber line module 22, cf. arrows 116 and 118. Copying is started at the memory location having the number N1. The data records 112 to 114 are then copied according to their memory location numbers N2 and NX. The copying operation is shown by data records 120 to 124, which are copies of the data records 110 to 114. A memory in the subscriber line module 22 stores the copies 120 to 124 as data records 130 to 134 at memory locations N1 to NX. The storage of a data record 130 to 134 is acknowledged via the cross channel 66 using a respective acknowledgement message sent from the subscriber line module 22 to the subscriber line module 12, cf. arrow 136.

Figure 3:
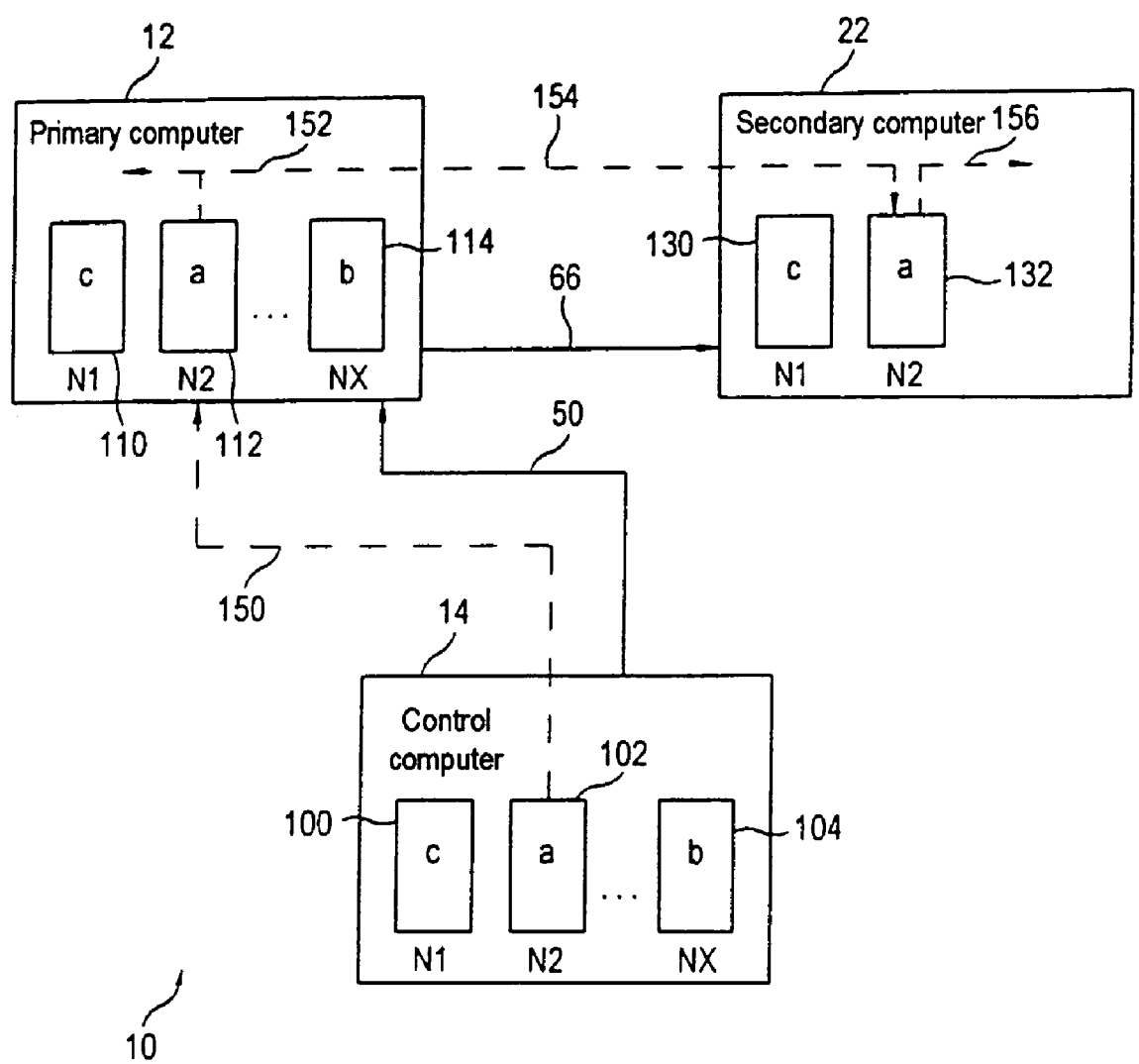
FIG. 3 shows the transmission of change reports during copying of the data records.

FIG. 3 shows the transmission of change reports during copying of the data records 110 to 114 to the subscriber line module 22. It will be assumed that the data records 110, 112 have already been copied, which means that the subscriber line module 22 stores the data records 130 and 132 corresponding to the data records 110 and 112. The rest of the data records up to the data record 114 have not yet been copied. After the data record 112 has been copied and before the other data records up to the data record 114 have been copied, the data record 102, which contains the same data as the data record 112, is erased in the control computer on account of a connection cleardown. The transmission channel 50 is used to send a change report to the subscriber line module 12 immediately, on the basis of which the data record 112 needs to be erased, cf. arrow 150. In the subscriber line module 12, the change report 150 is processed immediately, with the data record 112 being erased. The result of erasure is that the circuit 40, cf. FIG. 1, is driven in line with the change, cf. arrow 152. In addition, the subscriber line module 12 checks whether the data record 112 has already been copied. Since this is the case is, the change report concerning the data record 112 is sent via the cross channel 66 to the subscriber line module 22 as a change report 154.

Following receipt of the change report 154, the subscriber line module 22 erases the data record 132 corresponding to the data record 112. When the data record 132 has been erased, the circuit 60, cf. FIG. 1, is driven in line with the change, cf. arrow 156. Receipt of the change report 154 is confirmed to the subscriber line module 12 by the subscriber line module 22 via the duplex transmission channel 66. Copying of the other data records up to the data record 114 is then continued.

If a change report received via the transmission channel 50 concerns a data record, e.g. the data record 114, which has not yet been copied, the data record is changed in the subscriber line module 12 in line with the change report. No change report is forwarded to the subscriber line module 22.

The method explained with reference to FIGS. 2 and 3 allows copies of the data records 100 to 114 to be transmitted from the subscriber line module 12 to the subscriber line module 22, with changes to the data records 110 to 114 which are to be copied being processed during the actual copying operation. At the end of the copying operation, that is to say when all the data records 110 to 114 have been copied from the subscriber line module 12 to the subscriber line module 22, the subscriber line module 22 is on operational standby for adopting the function of the subscriber line module 12 in the event of a fault in this module. When changing over between the subscriber line modules 12 and 22, no significant data loss occurs from this time onward. The specified method is a safe method for preventing data loss as a result of operating faults in the subscriber line module 12, particularly in the case of existing connections of different length and even more so in the case of "permanent connections".

The method explained with reference to FIGS. 2 and 3 makes it possible to change over to the method explained with reference to FIG. 1 when the copying operation has finished. A "smooth" transition is obtained. Additional method steps do not need to be carried out.

Figure 4:
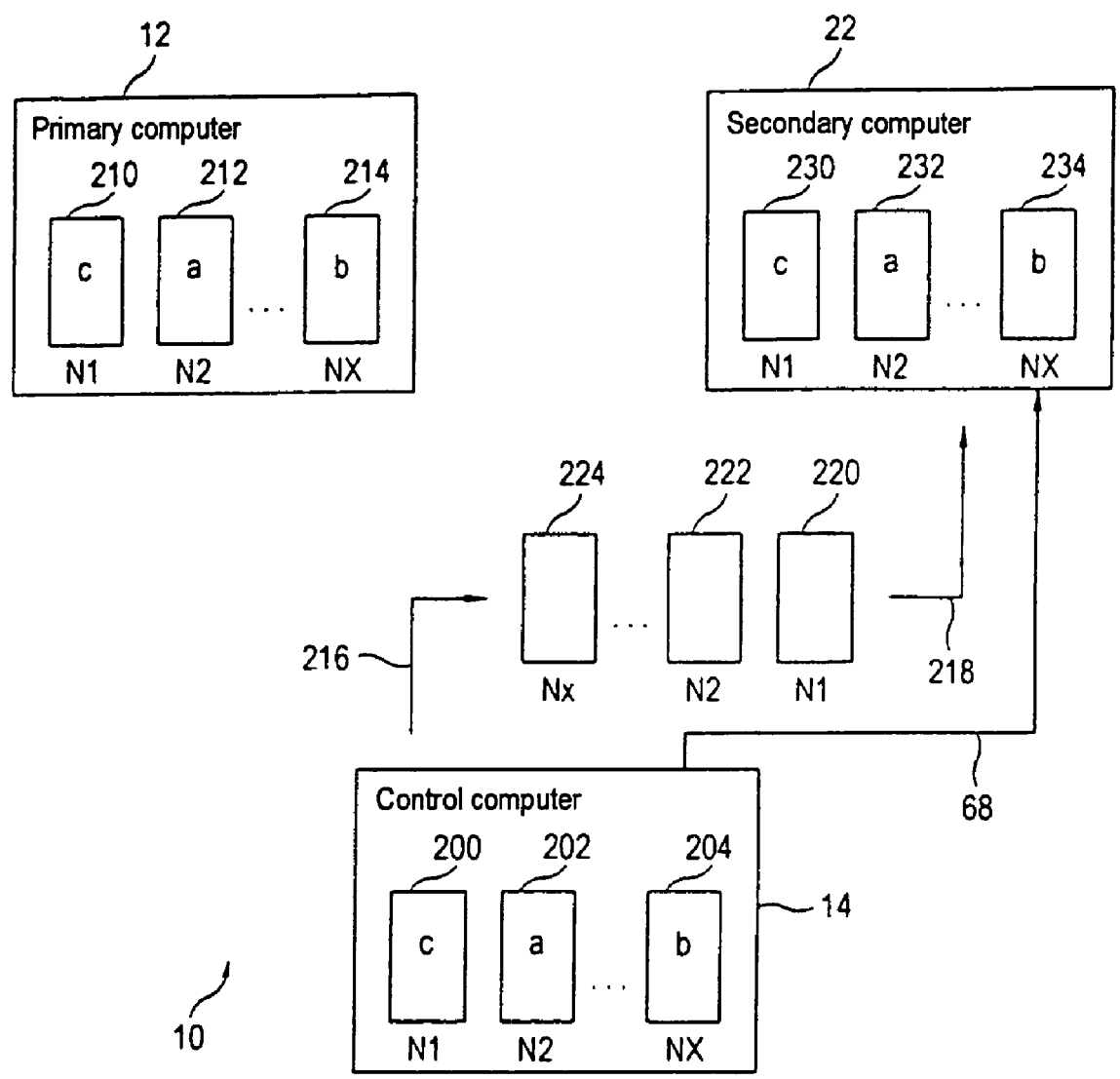
FIG. 4 shows the consistent copying of data records in the switching center in accordance with a second exemplary embodiment.

FIG. 4 shows the consistent copying of data records 200 to 204 in the switching center 10 in accordance with a second exemplary embodiment. Before the start of the method, the data records 200 to 204 are gradually stored in the memory in the control computer 14 during connection setup and connection cleardown. Likewise before the start of the method, the copies 210 to 214 of the data records 200 to 204 are transmitted from the control computer 14 to the subscriber line module 12 using change reports and are stored in the memory in the subscriber line module 12. The order in which the data records 200 to 204 are produced is again indicated by lower case letters a, b and c. The data record 202 was produced first. Next, the data record 204 was produced. The data record 200 was produced last.

In the exemplary embodiment shown in FIG. 4, the data records 200 to 204 are transmitted directly from the control computer 14 to the subscriber line module 22 via the transmission channel 68, cf. arrows 216 and 218. Data records 220 to 224 transmitted in the transmission channel 68 are copies of the data records 200 to 204 in this order. The data records 200 to 204 are transmitted in the order in which they were stored in the memory, i.e. in line with the numbers N1 to NX. Hence, the data record 200 is copied first, then the data record 202 and finally the data record 204.

The subscriber line module 22 stores the data records 220 to 224 transmitted via the transmission channel 68 as data records 230 to 234. In the exemplary embodiment shown in FIG. 4, the cross channel 66, cf. FIGS. 1 to 3, is not present. The subscriber line module 22 receives the data records and the change reports exclusively from the control computer 14 directly, i.e. without the involvement of the subscriber line module 12.

Figure 5:
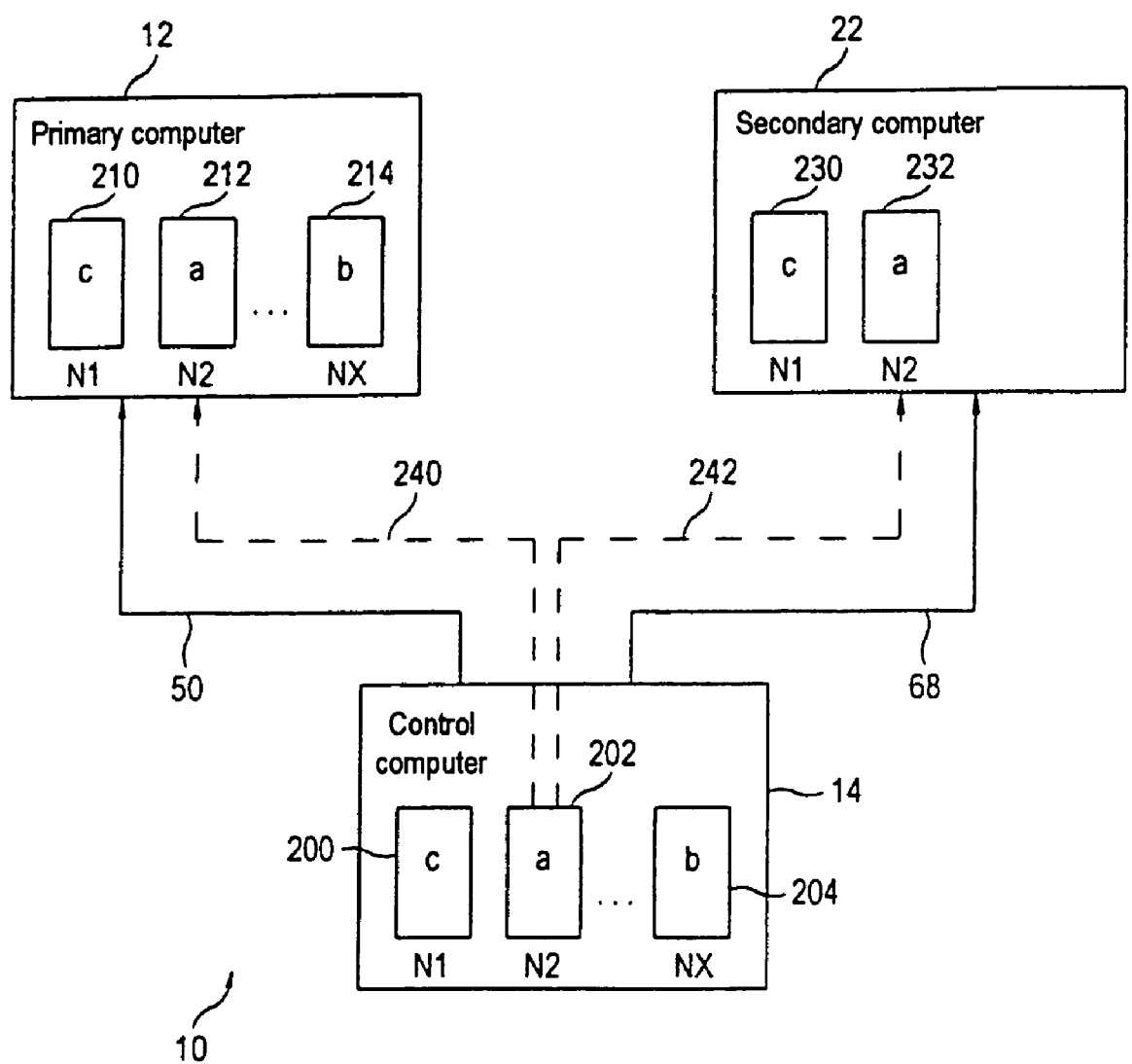
FIG. 5 shows the transmission of change reports during copying of the data records in the case of the second exemplary embodiment.

FIG. 5 shows the transmission of change reports during copying of the data records 200 to 204. It is again assumed that the data records 200 and 202 have already been copied and hence the data records 230 and 232 have already been stored in the subscriber line module 22. Before the data record 204 is actually copied, the connection denoted by the data record 202 is ended. The result of this is that the data record 202 is erased in the memory in the control computer 14. Immediately after erasure, the control computer 14 produces a first change report 240 which is sent to the subscriber line module 12 via the transmission channel 50. The change report 240 contains a command for erasing the data record 212 in the memory in the subscriber line module 12. The change report 240 is processed in the subscriber line module 12 immediately after receipt, with the data record 212 being erased. The erasure of the data record 212 influences the driving of the circuit 40, cf. FIG. 1.

At the same time as the change report 240, the control computer 14 sends a change report 242 to the subscriber line module 22 via the transmission channel 68. The change report 242 is processed in the subscriber line module 22 before the next data record 204 is actually copied. During processing, the data record 232 is erased from the memory in the subscriber line module 22, and the circuit 60, cf. FIG. 1, in the subscriber line module 22 is driven in line with the change.

The method based on FIGS. 5 and 6 also allows the method explained with reference to FIG. 1 to be carried out immediately after the copying operation has finished. Additional method steps do not need to be carried out.

In the case of another exemplary embodiment of the copying method, the cross channel 66, cf. FIGS. 1 to 3, is used for transmitting the data records, and the transmission channel 68 is used for transmitting the change reports. In the case of another exemplary embodiment, the data records are transmitted via the transmission channel 68, and the change report, as explained above with reference to FIG. 3, is transmitted via the transmission channel 50 and the cross channel 66.

The invention claimed is:

1. A method for operating a secondary computer, comprising:
   storing data in a memory unit of a primary computer, and a memory unit in a secondary computer stores a duplicate of the data;
   producing change reports about the data based on events during operation of a control computer;
   transmitting an event's associated change report from the control computer to the primary computer after the event; and
   transmitting a duplicate of the change report from the control computer to the secondary computer, wherein the data and the duplicate of the data are changed based on the change reports,
and the duplicates of the change reports are transmitted to the secondary computer after the event in question.

2. The method as claimed in claim 1, wherein the duplicates of the change reports are transmitted from the control computer to the secondary computer without the involvement of the primary computer.

3. The method as claimed in claim 2, wherein the first data volume is transmitted in blocks with other data volumes, and/or the second data volume is transmitted in blocks with other data volumes.

4. The method as claimed in claim 1, wherein the duplicates of the change reports are transmitted from the primary computer to the secondary computer.

5. The method as claimed claim 1, wherein the computers operate asynchronously with respect to one another, and/or in that various memory units are used.

6. The method as claimed in claim 1, further comprising:
using a switching device for switching connections between various subscribers, wherein
a data volume has at least one data record having respective data for a particular connection, and the secondary computer is an access unit for connecting a connecting line between two switching devices or for connecting subscribers.

7. A method for operating a secondary computer, comprising:
storing a first data volume and a second data volume in a memory unit in an originating computer;
transmitting the first data volume or a duplicate of the first data volume from the originating computer to a secondary computer and storing it in a memory unit in a secondary computer;
producing at least one change report about a change in the first data volume after or during transmission of the data in the first data volume or of the duplicate of the first data volume to the secondary computer, the change report being transmitted to the secondary computer and to the originating computer from a control computer, wherein
following transmission of the change report, the second data volume or a duplicate of the second data volume is transmitted from the originating computer to the secondary computer and is stored in the memory unit in the secondary computer.

8. The method as claimed in claim 7, wherein the secondary computer adopts the function of the originating computer in the event of operating faults,
the change reports about the first data volume and the second data volume are transmitted from a control computer for controlling the originating computer to the originating computer,
the originating computer checks whether the change reports concern the first data volume or the second data volume, and
change reports which concern the first data volume are transmitted from the originating computer to the secondary computer.

9. The method as claimed in claim 7, wherein the secondary computer adopts the function of the originating computer in the event of operating faults,
and change reports concerning the first data volume and the second data volume are transmitted from a control computer for controlling the secondary computer to the secondary computer without the involvement of the originating computer.

10. The method as claimed in claim 7, wherein the originating computer controls the secondary computer and a primary computer, whose function is adopted by the secondary computer in the event of operating faults,
the originating computer checks whether change reports which are to be transmitted concern the first data volume or the second data volume,
and change reports which concern the first data volume are transmitted to the secondary computer.

11. The method as claimed in claim 7, wherein the originating computer controls the secondary computer,
the change reports are transmitted from the originating computer to a primary computer, whose function is adopted by the secondary computer in the event of operating faults in the primary computer,
the control computer checks whether change reports which are to be transmitted concern the first data volume or the second data volume,
change reports concerning the first data volume and/or concerning the second data volume are marked, and
the primary computer sends change reports to the secondary computer on the basis of the markings.

12. The method as claimed in claim 7, wherein the first data volume is transmitted in blocks with other data volumes, and/or the second data volume is transmitted in blocks with other data volumes.

13. The method as claimed claim 7, wherein the computers operate asynchronously with respect to one another, and/or in that various memory units are used.

14. The method as claimed in claim 7, further comprising:
using a switching device for switching connections between various subscribers, wherein
a data volume has at least one data record having respective data for a particular connection, and the secondary computer is an access unit for connecting a connecting line between two switching devices or for connecting subscribers.

15. A switching device for operation, comprising:
a first access unit to which an access line is connected and which includes a primary computer having a first memory unit for storing connection data;
a second access unit which adopts the function of the first access unit in the event of an operating fault, and includes a secondary computer having a second memory unit for storing duplicates of the connection data; and
a control computer which produces change reports on the basis of events during operation of the switching device, wherein
the control computer transmits change reports concerning changes in the connection data to the primary computer and to the secondary computer immediately.

16. A switching device for flawless operation, comprising:
an originating unit which has an originating computer having a first memory unit for storing a first data volume and a second data volume at a start time;
a second unit which has a secondary computer having a second memory unit; and
a control unit for controlling the switching device, wherein the control unit prompts transmission of the data volumes or transmission of copies of the data volumes after a start time, and, during transmission of the data volumes to the secondary computer, change reports concerning changes in the data volumes are sent to the secondary computer.

17. A system for operating a secondary computer, comprising:
a first memory unit in a primary computer;
a second memory unit in a secondary computer storing a duplicate of the data; and
a control computer producing change reports about the data based on events during operation of a control computer, the control computer transmitting an event's associated change report to the primary computer after the event, wherein
a duplicate of the change report is transmitted to the secondary computer,
the data and the duplicate of the data are changed based on the change reports,
and the duplicates of the change reports are transmitted to the secondary computer after the event in question.

18. A program for operating a secondary computer, having a command sequence configured for execution by at least one processor in a data processing installation, comprising:
storing data in a memory unit of a primary computer, and a memory unit in a secondary computer stores a duplicate of the data;
producing change reports about the data based on events during operation of a control computer;
transmitting an event's associated change report to the primary computer after the event; and
transmitting a duplicate of the change report to the secondary computer, wherein
the data and the duplicate of the data are changed based on the change reports,
and the duplicates of the change reports are transmitted to the secondary computer after the event in question.

* * * * *